US012700244B2

(12) United States Patent
Xia et al.

(10) Patent No.: US 12,700,244 B2
(45) Date of Patent: Aug. 4, 2026

(54) METHOD FOR PROCESSING MAP, ELECTRONIC DEVICE AND STORAGE MEDIUM

(71) Applicant: Beijing Baidu Netcom Science Technology Co., Ltd., Beijing (CN)

(72) Inventors: Deguo Xia, Beijing (CN); Jizhou Huang, Beijing (CN); Jianzhong Yang, Beijing (CN); Yanlei Gu, Beijing (CN); Zhen Lu, Beijing (CN); Tingting Cao, Beijing (CN); Qiuyang Xu, Beijing (CN); Xipeng Zong, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 659 days.

(21) Appl. No.: 18/173,643

(22) Filed: Feb. 23, 2023

(65) Prior Publication Data

US 2023/0196793 A1     Jun. 22, 2023

(30) Foreign Application Priority Data

Mar. 23, 2022     (CN) .......................... 202210285172.2

(51) Int. Cl.
| | |
|---|---|
| *G06V 20/56* | (2022.01) |
| *G01C 21/00* | (2006.01) |
| *G06T 7/10* | (2017.01) |

(52) U.S. Cl.
CPC ....... *G06V 20/588* (2022.01); *G01C 21/3815* (2020.08); *G06T 7/10* (2017.01); *G06T 2207/30256* (2013.01)

(58) Field of Classification Search
CPC ................ G06V 20/588; G06V 20/182; G06T 2207/30256; G06T 7/10; G01C 21/3815
See application file for complete search history.

(56) References Cited

FOREIGN PATENT DOCUMENTS

| | | |
|---|---|---|
| CN | 104050237 | 9/2014 |
| CN | 109059954 | 12/2018 |

(Continued)

OTHER PUBLICATIONS

H. Ma, X. Cheng, X. Wang and J. Yuan, "Road information extraction from high resolution remote sensing images based on threshold segmentation and mathematical morphology," 2013 6th International Congress on Image and Signal Processing (CISP), Hangzhou, China, 2013, pp. 626-630 (Year: 2013).*

(Continued)

*Primary Examiner* — Amandeep Saini
(74) *Attorney, Agent, or Firm* — HSML P.C.

(57) ABSTRACT

A method for processing a map, an electronic device, and a storage medium, which relate to a technical field of computer technology, in particular to computer vision technology and high-definition map technology. The method includes: segmenting a first road line to obtain a plurality of first sub-road lines, wherein the first road line is obtained according to a segmentation mask for an image, and the image corresponds to a target region; segmenting a second road line to obtain a plurality of second sub-road lines, wherein the second road line is obtained according to a trajectory information corresponding to the target region; and determining a target road line according to first similarities between the plurality of first sub-road lines and the plurality of second sub-road lines.

13 Claims, 6 Drawing Sheets

200

A first road line in a map is segmented to obtain a plurality of first sub-road lines — S210

A second road line in the map is segmented to obtain a plurality of second sub-road lines — S220

A target road line is determined according to first similarities between the plurality of first sub-road lines and the plurality of second sub-road lines — S230

(56)        References Cited

FOREIGN PATENT DOCUMENTS

| CN | 109143291 |   | 1/2019 |   |   |
|----|-----------|---|--------|---|---|
| CN | 110008872 |   | 7/2019 |   |   |
| CN | 111121797 |   | 5/2020 |   |   |
| CN | 112067005 A | * | 12/2020 | ............ | G01S 19/42 |
| CN | 112131233 |   | 12/2020 |   |   |
| CN | 112131233 A | * | 12/2020 | ........... | G06V 20/182 |
| CN | 113239906 A | * | 8/2021 | ............ | G06F 18/22 |
| DE | 102014108255 |   | 12/2015 |   |   |

OTHER PUBLICATIONS

First Chinese Office Action, in the corresponding Chinese patent application No. 202210285172.2, dated Apr. 29, 2022, 15 pages (including machine translation).

* cited by examiner

100

200

300

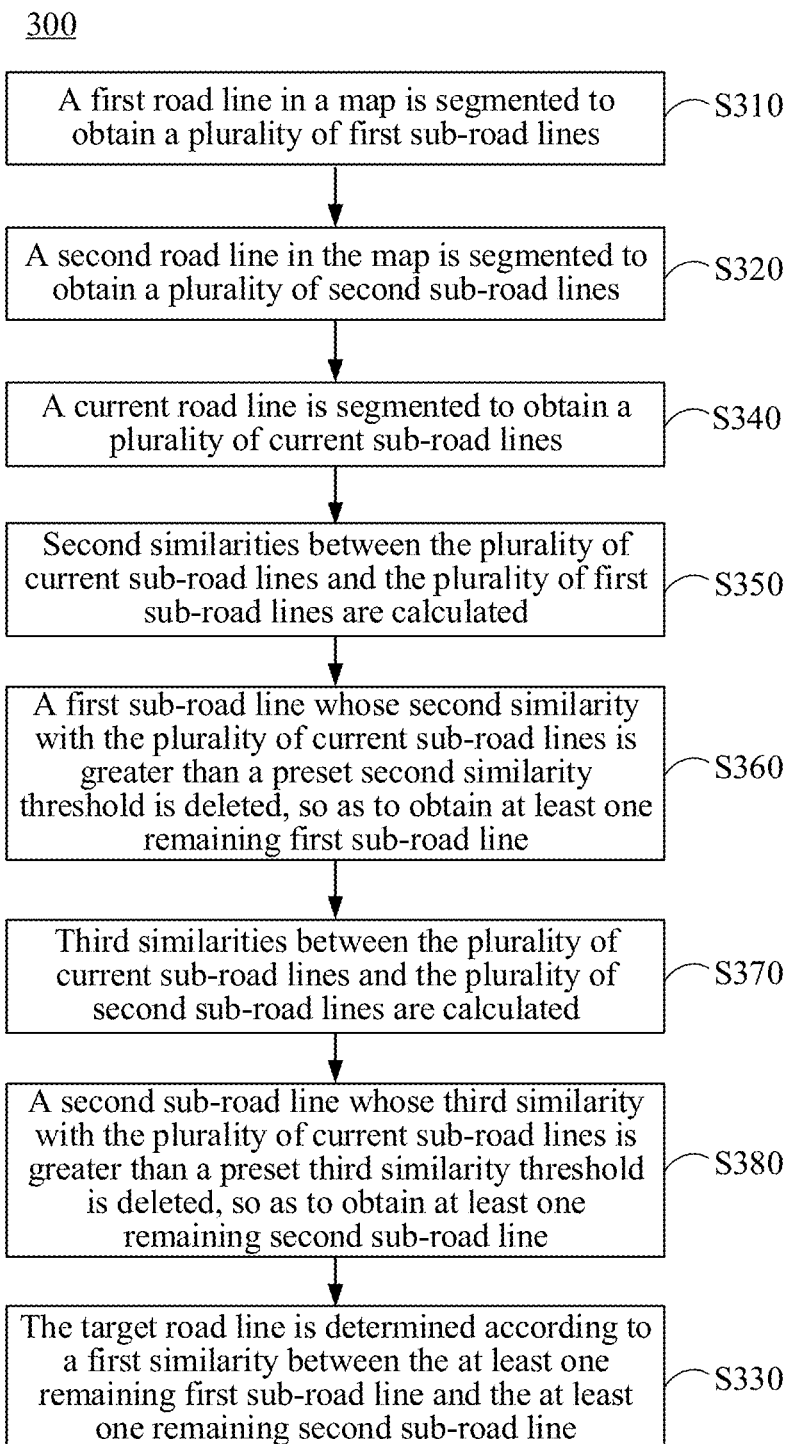

A first road line in a map is segmented to obtain a plurality of first sub-road lines — S310

A second road line in the map is segmented to obtain a plurality of second sub-road lines — S320

A current road line is segmented to obtain a plurality of current sub-road lines — S340

Second similarities between the plurality of current sub-road lines and the plurality of first sub-road lines are calculated — S350

A first sub-road line whose second similarity with the plurality of current sub-road lines is greater than a preset second similarity threshold is deleted, so as to obtain at least one remaining first sub-road line — S360

Third similarities between the plurality of current sub-road lines and the plurality of second sub-road lines are calculated — S370

A second sub-road line whose third similarity with the plurality of current sub-road lines is greater than a preset third similarity threshold is deleted, so as to obtain at least one remaining second sub-road line — S380

The target road line is determined according to a first similarity between the at least one remaining first sub-road line and the at least one remaining second sub-road line — S330

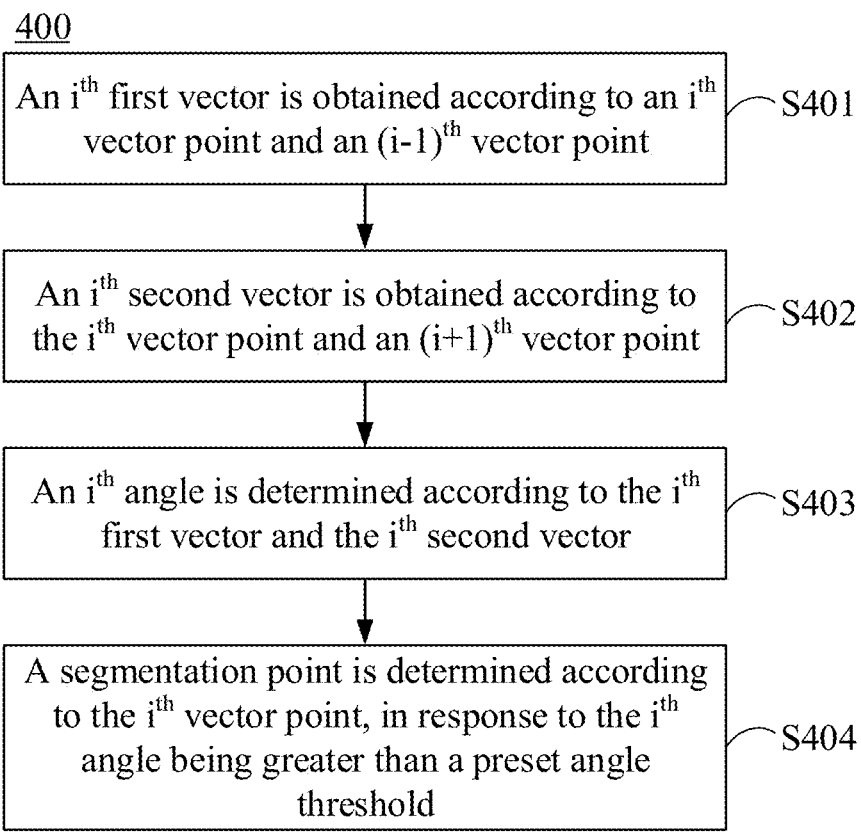

| | |
|---|---|
| An i$^{th}$ first vector is obtained according to an i$^{th}$ vector point and an (i-1)$^{th}$ vector point | S401 |
| An i$^{th}$ second vector is obtained according to the i$^{th}$ vector point and an (i+1)$^{th}$ vector point | S402 |
| An i$^{th}$ angle is determined according to the i$^{th}$ first vector and the i$^{th}$ second vector | S403 |
| A segmentation point is determined according to the i$^{th}$ vector point, in response to the i$^{th}$ angle being greater than a preset angle threshold | S404 |

FIG. 4

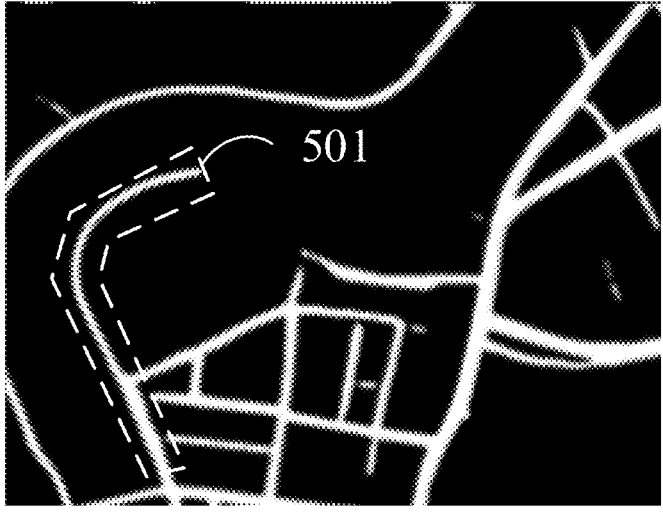

First segmentation module — 710

Second segmentation module — 720

Determination module — 730

METHOD FOR PROCESSING MAP, ELECTRONIC DEVICE AND STORAGE MEDIUM

CROSS REFERENCE TO RELATED APPLICATION

This application claims priority to Chinese Patent Application No. 202210285172.2, filed on Mar. 23, 2022, the entire content of which is incorporated herein in its entirety by reference.

TECHNICAL FIELD

The present disclosure relates to a technical field of computer technology, and in particular, to computer vision technology and high-definition map technology. More specifically, the present disclosure provides a method for processing a map, an electronic device, and a storage medium.

BACKGROUND

A navigation service may be provided for a user according to road data. A traffic facility is constantly updated, and relevant road data needs to be updated in time to improve a travel experience of the user.

SUMMARY

The present disclosure provides a method for processing a map, an electronic device, and a storage medium.

According to an aspect, a method for processing a map is provided, including: segmenting a first road line to obtain a plurality of first sub-road lines, wherein the first road line is obtained according to a segmentation mask for an image, and the image corresponds to a target region; segmenting a second road line to obtain a plurality of second sub-road lines, wherein the second road line is obtained according to a trajectory information corresponding to the target region; and determining a target road line according to first similarities between the plurality of first sub-road lines and the plurality of second sub-road lines.

According to an aspect, an electronic device is provided, including: at least one processor; and a memory communicatively connected to the at least one processor, wherein the memory stores instructions executable by the at least one processor, and the instructions, when executed by the at least one processor, are configured to cause the at least one processor to implement the method provided by the present disclosure.

According to an aspect, a non-transitory computer-readable storage medium having computer instructions therein is provided, wherein the computer instructions are configured to cause a computer system to implement the method provided by the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, in which:

FIG. 3 shows a flowchart of a method for processing a map according to embodiments of the present disclosure;

FIG. 4 shows a flowchart of a method for processing a map according to embodiments of the present disclosure;

FIG. 5A shows a schematic diagram of a segmentation mask for an image corresponding to a target region according to embodiments of the present disclosure;

DETAILED DESCRIPTION OF EMBODIMENTS

Exemplary embodiments of the present disclosure will be described below with reference to accompanying drawings, which include various details of the embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In order to acquire accurate road data, the road data may be acquired by using an acquisition vehicle, a user trajectory, or a satellite imagery. Further, a road line may be determined according to the road data.

In a method of acquiring road data by using the acquisition vehicle, it may be possible to acquire a road image by using the acquisition vehicle equipped with an acquisition device. Then the road image is processed to identify a missing road in a current map. However, this method requires a special acquisition device, with high cost and low timeliness, and also has a high requirement for the number of acquisition vehicles and the quality of road images, and cannot identify and supplement a large number of missing roads.

In a method of acquiring road data according to the user trajectory, it may be possible acquire the user trajectory to construct a trajectory map, and further acquire the road data through methods such as morphological processing and clustering processing. According to the acquired road data and road data in the current map, the missing road in the current map is obtained. This method has a high timeliness, but requires a lot of trajectory information. In addition, the user trajectory will drift, resulting in overlapping coverage of trajectories in a region with a dense road network, which will lead to a failure to identify a specific road. And, in a region with a sparse road network, such as a suburb, it is difficult to obtain enough trajectories. Therefore, this method has some limitations.

In a method of acquiring road data according to the satellite imagery, it may be possible to acquire a satellite imagery of a target region. The satellite imagery is input into an image segmentation model to obtain road data. However, the satellite imagery is easily affected by a light intensity, a building shadow, etc., resulting in inaccurate road data.

Figure 1:
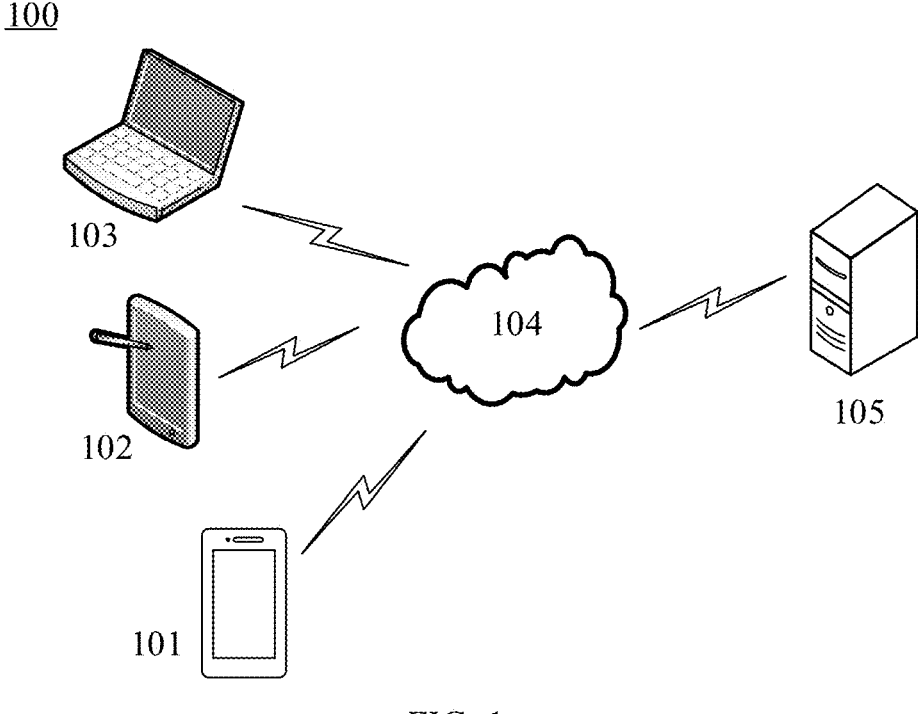
FIG. 1 shows a schematic diagram of an exemplary system architecture to which a method and an apparatus for processing a map can be applied according to embodiments of the present disclosure.

FIG. 1 shows a schematic diagram of an exemplary system architecture to which a method and an apparatus for processing a map can be applied according to embodiments of the present disclosure. It should be noted that FIG. 1 only shows an example of a system architecture to which embodiments of the present disclosure may be applied, so as to help those skilled in the art to understand the technical content of the present disclosure, but it does not mean that embodiments of the present disclosure cannot be used for other devices, systems, environment or scenarios.

As shown in FIG. 1, a system architecture 100 according to this embodiment may include terminal devices 101, 102 and 103, a network 104 and a server 105. The network 104 is a medium used to provide a communication link between the terminal devices 101, 102 and 103 and the server 105. The network 104 may include various connection types, such as a wired and/or wireless communication link, and the like.

The terminal devices 101, 102 and 103 may be used by a user to interact with the server 105 through the network 104 to receive or send a massage and the like. The terminal devices 101, 102 and 103 may be any electronic device having a display screen and supporting web browsing, including but not limited to a smart phone, a tablet computer, a laptop computer, a desktop computer, and the like.

The server 105 may be a server that provides various services, such as a background management server (just an example) that supports a website browsed by the user using the terminal devices 101, 102 and 103. The background management server may analyze and process received data such as a user request, and feedback a processing result to the terminal device.

It should be noted that the method for processing a map provided by embodiments of the present disclosure may generally be executed by the server 105. Accordingly, the apparatus for processing a map provided by embodiments of the present disclosure may be provided in the server 105. The method for processing a map provided by the embodiments of the present disclosure may also be executed by a server or a server cluster different from the server 105 and capable of communicating with the terminal devices 101, 102 and 103 and/or the server 105. Accordingly, the apparatus for processing a map provided by the embodiments of the present disclosure may also be provided in the server or the server cluster different from the server 105 and capable of communicating with the terminal devices 101, 102 and 103 and/or the server 105.

Figure 2:
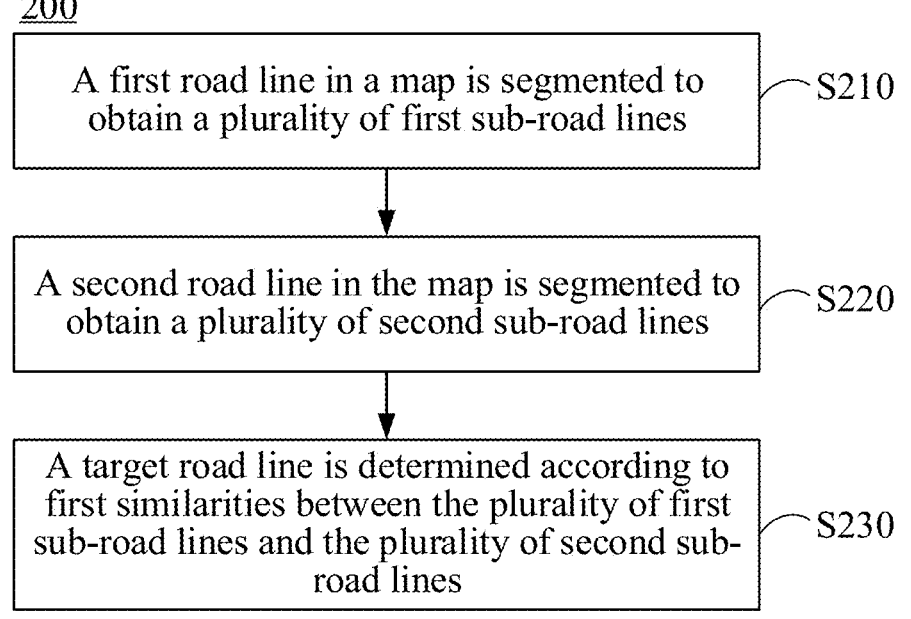
FIG. 2 shows a flowchart of a method for processing a map according to embodiments of the present disclosure.

FIG. 2 shows a flowchart of a method for processing a map according to embodiments of the present disclosure.

As shown in FIG. 2, a method 200 may include operations S210 to S230.

In operation S210, a first road line is segmented to obtain a plurality of first sub-road lines.

In embodiments of the present disclosure, the first road line is obtained according to a segmentation mask for an image, and the image corresponds to a target region.

For example, the image corresponding to the target region is input into a semantic segmentation model to obtain the segmentation mask for the image.

For example, it may be possible to perform a morphological processing on the segmentation mask for the image corresponding to the target region, so as to obtain a first initial road line. In an example, the morphological processing includes at least one selected from an expansion processing, a corrosion processing, an opening processing, or a closing processing.

For example, the first initial road line is compressed to obtain the first road line. In an example, the Douglas-Peucker algorithm may be used for compression to obtain the first road line.

In operation S220, a second road line is segmented to obtain a plurality of second sub-road lines.

In embodiments of the present disclosure, the second road line is obtained according to a trajectory information corresponding to the target region.

For example, the trajectory information may be denoised and filtered to obtain a trajectory map corresponding to the target region, so as to obtain the second road line.

It may be understood that the second road line may be obtained in various ways according to the trajectory information, which is not limited in the present disclosure.

In operation S230, a target road line is determined according to first similarities between the plurality of first sub-road lines and the plurality of second sub-road lines.

In embodiments of the present disclosure, a first similarity between each of the plurality of first sub-road lines and each of the plurality of second sub-road lines may be calculated.

For example, a first similarity between a first sub-road line $R_{11}$ and a second sub-road line $R_{21}$ is 0.4. A first similarity between the first sub-road line $R_{11}$ and a second sub-road line $R_{22}$ is 0.1.

In embodiments of the present disclosure, according to a second sub-road line having the greatest first similarity with each first sub-road line, the second sub-road line corresponding to that first sub-road line is determined.

For example, the second sub-road line $R_{21}$ is a second sub-road line having the greatest similarity with the first sub-road line $R_{11}$, and the second sub-road line $R_{21}$ may be determined as a second sub-road line corresponding to the first sub-road line $R_{11}$.

In embodiments of the present disclosure, K first sub-road line and K second sub-road line corresponding to the K first sub-road line are obtained according to the first similarities and a preset first similarity threshold.

For example, K first sub-road line and K second sub-road line corresponding to the K first sub-road line are obtained according to the first similarities and a preset first similarity threshold.

For example, K is an integer greater than or equal to 1.

For example, the preset first similarity threshold of 0.3 is taken as an example. The similarity between the first sub-road line $R_{11}$ and the second sub-road line $R_{21}$ is 0.4. Therefore, the first sub-road line Ru may be determined as one of the K first sub-road line. The second sub-road line $R_{21}$ may be determined as one of the K second sub-road line.

In embodiments of the present disclosure, the target road line is determined according to the K first sub-road line and the K second sub-road line.

For example, a $m^{th}$ target sub-road line is determined according to a length of a $k^{th}$ first sub-road line and a length of a second sub-road line corresponding to the $k^{th}$ first sub-road line.

In an example, k is an integer less than or equal to K.

In an example, a length of the first sub-road line $R_{11}$ is less than that of the second sub-road line $R_{21}$. The second sub-road line $R_{21}$ may be determined as one target sub-road line.

For example, the target road line is determined according to the $m^{th}$ target sub-road line.

In an example, m is an integer greater than or equal to 1.

In an example, the second sub-road line $R_{21}$ may be added to a map, so as to determine the target road line.

It may be understood that a location information of the $m^{th}$ target sub-road line in the image corresponding to the target region or a location information of the $m^{th}$ target sub-road line in the trajectory map corresponding to the target region may be determined. Therefore, the $m^{th}$ target sub-road line may be added to the map to obtain the target road line.

Through embodiments of the present disclosure, the trajectory information corresponding to the target region and an information of the segmentation mask for the image are integrated, which may effectively extract a road line with a more accurate shape and improve a road quality. It is helpful to improve a navigation experience of the user and improve a competitiveness of a map product.

In some embodiments, the above-mentioned image corresponding to the target region may be a satellite imagery corresponding to the target region.

In some embodiments, a current map may be updated according to the target road line, so as to obtain an updated map. For example, the target road line may be added to the current map, so as to obtain the updated map.

FIG. 3 shows a flowchart of a method for processing a map according to embodiments of the present disclosure.

As shown in FIG. 3, a method 300 may include operations S310 to S320, operations S340 to S380, and operation S330. The operations S340 to S380 may be implemented before the operation S330.

In operation S310, a first road line is segmented to obtain a plurality of first sub-road lines.

In embodiments of the present disclosure, the first road line may be obtained according to a segmentation mask for an image, and the image corresponds to a target region.

In operation S320, a second road line is segmented to obtain a plurality of second sub-road lines.

In embodiments of the present disclosure, the second road line may be obtained according to a trajectory information corresponding to the target region.

It may be understood that the operations S310 and S320 in the method 300 are the same or similar to the operations S210 and S220 in the method 200, which will not be repeated here.

In operation S340, a current road line is segmented to obtain a plurality of current sub-road lines.

For example, the current road line may be a road line in a current map.

For example, a plurality of current sub-road lines such as a current sub-road line $R_{01}$, a current sub-road line $R_{02}$, and a current sub-road line $R_{03}$ may be obtained by segmenting the current road line. Next, a detailed description will be given according to the current sub-road line $R_{01}$.

In operation S350, second similarities between the plurality of current sub-road lines and the plurality of first sub-road lines are calculated.

For example, as described above, the first sub-road lines include the first sub-road line $R_{11}$ and the like. In this embodiment, the first sub-road lines further include a first sub-road line $R_{12}$.

In an example, a second similarity between the current sub-road line $R_{01}$ and the first sub-road line $R_{11}$ is 0.2. A second similarity between the current sub-road line $R_{01}$ and the first sub-road line $R_{12}$ is 0.8.

In operation S360, a first sub-road line whose second similarity with the plurality of current sub-road lines is greater than a preset second similarity threshold is deleted, so as to obtain at least one remaining first sub-road line.

For example, the preset second similarity threshold of 0.7 is taken as an example. The above-mentioned first sub-road line $R_{12}$ may be deleted, so as to obtain at least one remaining first sub-road line including the first sub-road line $R_{11}$.

In operation S370, third similarities between the plurality of current sub-road lines and the plurality of second sub-road lines are calculated.

For example, as described above, the second sub-road lines include the second sub-road line $R_{21}$ and the second sub-road line $R_{22}$. In this embodiment, the second sub-road lines further include a second sub-road line $R_{23}$.

In an example, a third similarity between the current sub-road line $R_{01}$ and the second sub-road line $R_{21}$ is 0.3. A third similarity between the current sub-road line $R_{01}$ and the second sub-road line $R_{23}$ is 0.9. A third similarity between the current sub-road line $R_{01}$ and the second sub-road line $R_{22}$ is 0.3.

In operation S380, a second sub-road line whose third similarity with the plurality of current sub-road lines is greater than a preset third similarity threshold is deleted, so as to obtain at least one remaining second sub-road line.

For example, the preset third similarity threshold of 0.7 is taken as an example. The above-mentioned second sub-road line $R_{23}$ may be deleted, so as to obtain at least one remaining second sub-road line including the second sub-road line $R_{21}$ and the second sub-road line $R_{22}$.

In operation S330, the target road line is determined according to a first similarity between the at least one remaining first sub-road line and the at least one remaining second sub-road line.

It may be understood that the operation S330 in the method 300 is the same or similar to the operation S230 in the method 200, which will not be repeated here.

For example, it may be understood that the target road line is determined according to the above-mentioned preset first similarity threshold, the at least one remaining first sub-road line $R_{11}$, and the at least one remaining second sub-road line $R_{21}$ and second sub-road line $R_{22}$.

Through embodiments of the present disclosure, the plurality of first sub-road lines and the plurality of second sub-road lines are de-duplicated by using the current road line in the current map, so as to reduce an amount of calculation required to determine the target road line, while improving an accuracy of determining the target sub-road line.

In some embodiments, a current road line is segmented to obtain a plurality of current sub-road lines; second similarities between the plurality of current sub-road lines and the plurality of first sub-road lines are calculated; and a first sub-road line whose second similarity with the plurality of current sub-road lines is greater than a preset second similarity threshold is deleted, so as to obtain at least one remaining first sub-road line. Determining a target road line according to first similarities between the plurality of first sub-road lines and the plurality of second sub-road lines includes: determining the target road line according to first similarities between the at least one remaining first sub-road line and the plurality of second sub-road lines. It may be understood that this embodiment is the same or similar to the operations S340 to S360 and the operation S330 in the above-mentioned method 300, which will not be repeated here.

In some embodiments, a current road line is segmented to obtain a plurality of current sub-road lines; third similarities between the plurality of current sub-road lines and the plurality of second sub-road lines are calculated; and a second sub-road line whose third similarity with the plurality of current sub-road lines is greater than a preset third similarity threshold is deleted, so as to obtain at least one remaining second sub-road line. Determining the target road line according to first similarities between the plurality of first sub-road lines and the plurality of second sub-road lines includes: determining the target road line according to first similarities between the at least one remaining second sub-road line and the plurality of first sub-road lines. It may be understood that this embodiment is the same or similar to the operation S340, operations S370 to S380, and operation S330 in the above-mentioned method 300, which will not be repeated here.

FIG. 4 shows a flowchart of a method for processing a map according to embodiments of the present disclosure.

The above-mentioned first road line and second road line each include at least one vector point.

As shown in FIG. 4, a method 400 may implement the following operations S401 to S404 for the at least one vector point of each of the first road line and the second road line, so as to obtain a plurality of segmentation points. The method 400 may be implemented before the above-mentioned operation S210 or S310.

In operation S401, an $i^{th}$ first vector is obtained according to an $i^{th}$ vector point and an $(i-1)^{th}$ vector point.

For example, the $i^{th}$ first vector may be a vector whose $i^{th}$ vector point points to the $(i-1)^{th}$ vector point.

In operation S402, an $i^{th}$ second vector is obtained according to the $i^{th}$ vector point and an $(i+1)^{th}$ vector point.

For example, the $i^{th}$ second vector may be a vector whose $i^{th}$ vector point points to the $(i+1)^{th}$ vector point.

In operation S403, an $i^{th}$ angle is determined according to the $i^{th}$ first vector and the $i^{th}$ second vector.

For example, the $i^{th}$ angle is 125°.

In operation S404, a segmentation point is determined according to the $i^{th}$ vector point, in response to the $i^{th}$ angle being greater than a preset angle threshold.

For example, the preset angle threshold of 120° is taken as an example. It may be determined that the $i^{th}$ angle (125°) in this embodiment is greater than the preset angle threshold (120°). The $i^{th}$ vector point may be determined as the segmentation point.

It may be understood that the current road line also includes at least one vector point. A plurality of segmentation points for the current road line may be determined in the same or similar manner as the method 400.

FIG. 5A shows a schematic diagram of a segmentation mask for an image corresponding to a target region according to embodiments of the present disclosure.

As shown in FIG. 5A, a white line shown in FIG. 5A may be used as the first road line. FIG. 5A contains a region 501, and a line in the region 501 is a part of the first road line.

Figure 5B:
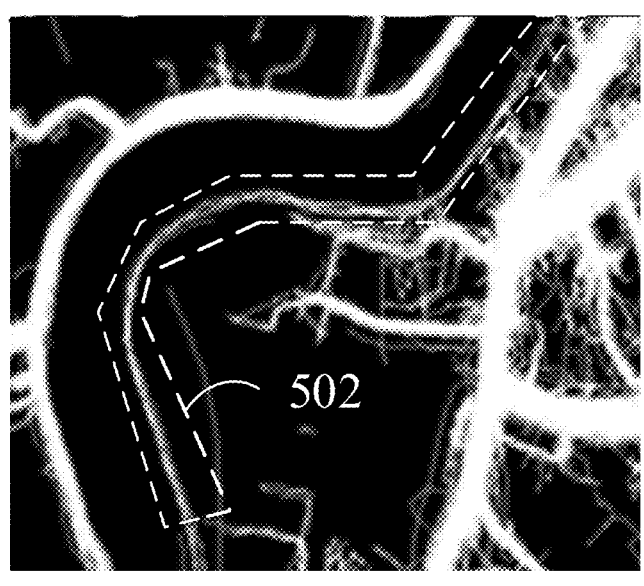
FIG. 5B shows a schematic diagram of a trajectory map corresponding to a target region according to embodiments of the present disclosure.

FIG. 5B shows a schematic diagram of a trajectory map corresponding to a target region according to embodiments of the present disclosure.

As shown in FIG. 5B, a white line shown in FIG. 5B may be used as the second road line. A trajectory map shown in FIG. 5B is obtained according to a trajectory information corresponding to the target region shown in FIG. 5A.

FIG. 5B contains a region 502, and a line in the region 502 is a part of the second road line.

Figure 6A:
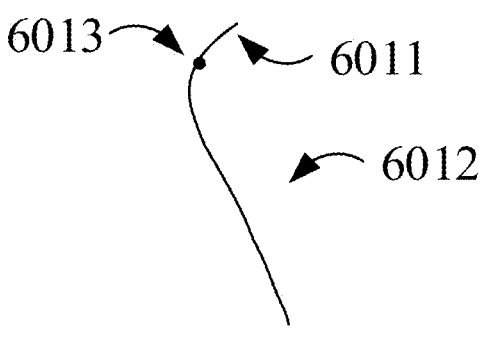
FIG. 6A shows a schematic diagram of a current sub-road line according to embodiments of the present disclosure.

FIG. 6A shows a schematic diagram of a current sub-road line according to embodiments of the present disclosure.

As shown in FIG. 6A, a current sub-road line 6011 and a current sub-road line 6012 may be obtained by segmenting a current road line in a current map according to a segmentation point 6013. The current sub-road line 6012 may be the above-mentioned current sub-road line $R_{01}$.

Figure 6B:
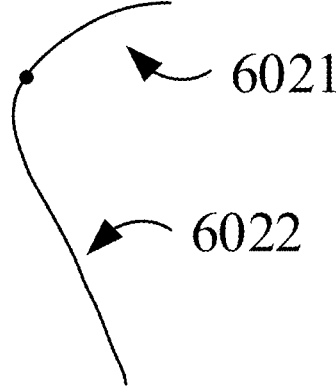
FIG. 6B shows a schematic diagram of a plurality of first sub-road lines according to embodiments of the present disclosure.

FIG. 6B shows a schematic diagram of a plurality of first sub-road lines according to embodiments of the present disclosure.

As shown in FIG. 6B, FIG. 6B includes a first sub-road line 6021 and a first sub-road line 6022. The first sub-road line 6021 may be the above-mentioned first sub-road line $R_{11}$. The first sub-road line 6022 may be the above-mentioned first sub-road line $R_{12}$.

In an example, the first sub-road line 6021 and the first sub-road line 6022 may be obtained by, for example, segmenting the part of the first road line within the region 501 shown in FIG. 5A.

The second similarity between the first sub-road line 6021 and the current sub-road line 6012 is 0.2. The second similarity between the first sub-road line 6022 and the current sub-road line 6012 is 0.8. As described above, the preset second similarity threshold of 0.7 is taken as an example. The first sub-road line 6022 may be deleted to obtain the remaining first sub-road line 6021. In this embodiment, both the second similarity between the first sub-road line 6021 and the current sub-road line 6011 and the second similarity between the first sub-road line 6022 and the current sub-road line 6011, are less than the preset second similarity threshold.

Figures 6C, 7:
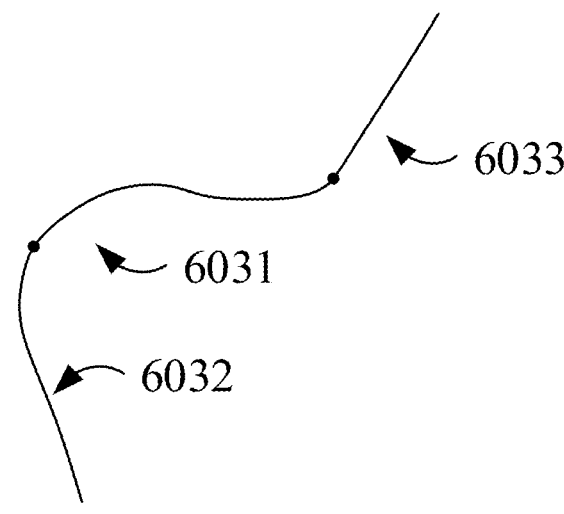
FIG. 6C shows a schematic diagram of a plurality of second sub-road lines according to embodiments of the present disclosure.
FIG. 7 is a block diagram of an apparatus for processing a map according to embodiments of the present disclosure.

FIG. 6C shows a schematic diagram of a plurality of second sub-road lines according to embodiments of the present disclosure.

As shown in FIG. 6C, FIG. 6C includes a second sub-road line 6031, a second sub-road line 6032, and a second sub-road line 6033. The second sub-road line 6031 may be the above-mentioned second sub-road line $R_{21}$. The second sub-road line 6032 may be the above-mentioned second sub-road line $R_{23}$. The second sub-road line 6033 may be the above-mentioned second sub-road line $R_{22}$.

In an example, the second sub-road line 6031 to the second sub-road line 6033 may be obtained by, for example, segmenting the part of the second road line within the region 502 shown in FIG. 5B.

The third similarity between the second sub-road line 6031 and the current sub-road line 6012 is 0.3. The third similarity between the second sub-road line 6032 and the current sub-road line 6012 is 0.9. The third similarity between the second sub-road line 6033 and the current sub-road line 6012 is 0.3. As described above, the preset third similarity threshold of 0.7 is taken as an example. The second sub-road line 6032 may be deleted to obtain the remaining two second sub-road lines, namely the second sub-road line 6031 and the second sub-road line 6033. In this embodiment, the third similarity between the second sub-road line 6031 and the current sub-road line 6011, the third similarity between the second sub-road line 6032 and the current sub-road line 6011, and the third similarity between the second sub-road line 6033 and the current sub-road line 6011 are all less than the preset third similarity threshold.

Next, the target road line may be determined according to the first similarity between the at least one remaining first sub-road line and the at least one remaining second sub-road line. For example, the first similarity between the first sub-road line 6021 and the second sub-road line 6031 is 0.4. The first similarity between the first sub-road line 6021 and the second sub-road line 6033 is 0.1. The second sub-road line 6031 may be determined as a second sub-road line corresponding to the first sub-road line 6021.

The preset first similarity threshold of 0.3 is taken as an example. The first similarity between the first sub-road line 6021 and the second sub-road line 6031 is 0.4, which is greater than 0.3. A target sub-road line may be determined according to the first sub-road line 6021 and the second sub-road line 6031. For example, as shown in FIGS. 6B and 6C, a length of the first sub-road line 6021 is less than that of the second sub-road line 6031, so that the second sub-road line 6031 may be determined as the target sub-road line.

For example, the second sub-road line 6031 may be added to the current map. For example, the current sub-road line 6011 is deleted, and then the second sub-road line 6031 is connected with an end point 6013 of the current sub-road line 6011, so as to obtain a part of the target road line.

It may be understood that the first similarity, the second similarity and the third similarity may be calculated in any way, which is not limited in the present disclosure.

FIG. 7 is a block diagram of an apparatus for processing a map according to embodiments of the present disclosure.

As shown in FIG. 7, an apparatus 700 may include a first segmentation module 710, a second segmentation module 720, and a determination module 730.

The first segmentation module 710 is used to segment a first road line to obtain a plurality of first sub-road lines. The above-mentioned first road line is obtained according to a segmentation mask for an image, and the image corresponds to a target region.

The second segmentation module 720 is used to segment a second road line to obtain a plurality of second sub-road lines. The above-mentioned second road line is obtained according to a trajectory information corresponding to the target region.

The determination module 730 is used to determine a target road line according to first similarities between the plurality of first sub-road lines and the plurality of second sub-road lines.

In some embodiments, the above-mentioned determination module includes a first calculation sub-module used to calculate a first similarity between each of the plurality of first sub-road lines and each of the plurality of second sub-road lines; a first determination sub-module used to, according to a second sub-road line having the greatest first similarity with each first sub-road line, determine the second sub-road line corresponding to the first sub-road line; a first obtaining sub-module used to obtain K first sub-road line and K second sub-road line corresponding to the K first sub-road line, according to the first similarities and a preset first similarity threshold. K is an integer greater than or equal to 1; and a second determination sub-module used to determine the target road line according to the K first sub-road line and the K second sub-road line.

In some embodiments, the above-mentioned second determination sub-module includes a first determination unit used to determine a $m^{th}$ target sub-road line according to a length of a $k^{th}$ first sub-road line and a length of a second sub-road line corresponding to the $k^{th}$ first sub-road line, where k is an integer less than or equal to K; and a second determination unit used to determine the target road line according to the $m^{th}$ target sub-road line, where m is an integer greater than or equal to 1.

In some embodiments, the apparatus 700 further includes a third segmentation module used to segment a current road line to obtain a plurality of current sub-road lines; a first calculation module used to calculate second similarities between the plurality of current sub-road lines and the plurality of first sub-road lines; and a first deleting module used to delete a first sub-road line whose second similarity with the plurality of current sub-road lines is greater than a preset second similarity threshold, so as to obtain at least one remaining first sub-road line. The above-mentioned determination module includes: a third determination sub-module used to determine the target road line according to first similarities between the at least one remaining first sub-road line and the plurality of second sub-road lines.

In some embodiments, the apparatus 700 further includes a second calculation module used to calculate third similarities between the plurality of current sub-road lines and the plurality of second sub-road lines; and a second deleting module used to delete a second sub-road line whose third similarity with the plurality of current sub-road lines is greater than a preset third similarity threshold, so as to obtain at least one remaining second sub-road line. The above-mentioned third determination sub-module includes: a third determination unit used to determine the target road line according to a first similarity between the at least one remaining first sub-road line and the at least one remaining second sub-road line.

In some embodiments, the first road line and the second road line each include at least one vector point. The above-mentioned apparatus further includes: an execution module used to, for the at least one vector point of each of the first road line and the second road line, execute relevant operations through the following sub-modules: a second obtaining sub-module used to obtain an $i^{th}$ first vector according to an $i^{th}$ vector point and an $(i-1)^{th}$ vector point, where i is an integer greater than or equal to 2; a third obtaining sub-module used to obtain an $i^{th}$ second vector according to the $i^{th}$ vector point and an $(i+1)^{th}$ vector point; a fourth determination sub-module used to determine an $i^{th}$ angle according to the $i^{th}$ first vector and the $i^{th}$ second vector; and a fifth determination sub-module used to determine a segmentation point according to the $i^{th}$ vector point, in response to the $i^{th}$ angle being greater than a preset angle threshold, so as to obtain a plurality of segmentation points.

In some embodiments, the first segmentation module is further used to segment the first road line according to the plurality of segmentation points for the first road line, so as to obtain the plurality of first sub-road lines.

In some embodiments, the second segmentation module is further used to segment the second road line according to the plurality of segmentation points for the second road line, so as to obtain the plurality of second sub-road lines.

In some embodiments, the first road line is obtained according to the segmentation mask for the image corresponding to the target region by: a morphological processing module used to perform a morphological processing on the segmentation mask for the image corresponding to the target region, so as to obtain a first initial road line; and a compression processing module used to compress the first initial road line to obtain the first road line.

In some embodiments, the apparatus 700 further includes an update module used to update a current map according to the target road line, so as to obtain an updated map.

In the technical solution of the present disclosure, the collection, storage, use, processing, sending, provision, disclosure and application of the location information, trajectory information, etc., involved are all in compliance with the relevant laws and regulations, and do not violate the public order and good customs.

According to embodiments of the present disclosure, the present disclosure further provides an electronic device, a readable storage medium, and a computer program product.

Figure 8:
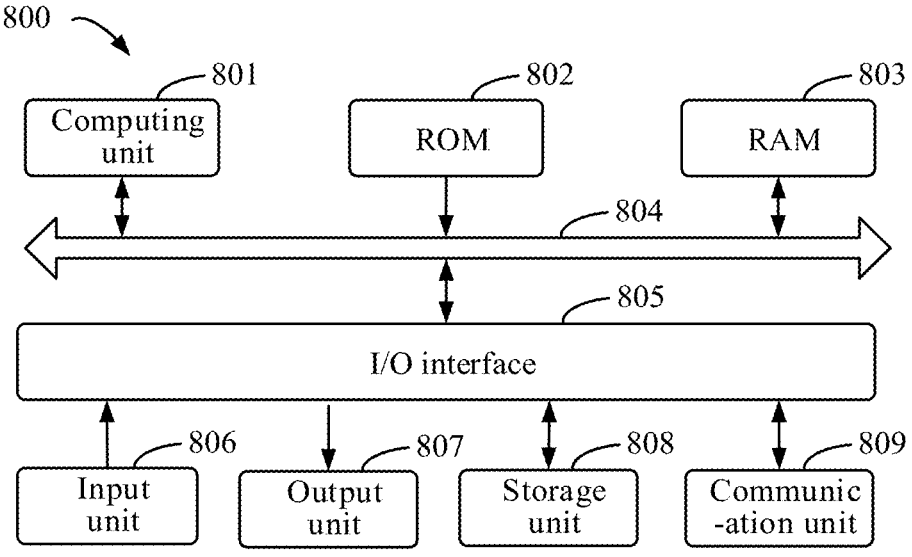
FIG. 8 is a block diagram of an electronic device for implementing a method for processing a map according to embodiments of the present disclosure.

FIG. 8 shows a schematic block diagram of an exemplary electronic device 800 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the device 800 may include a computing unit 801, which may perform various appropriate actions and processing based on a computer program stored in a read-only memory (ROM) 802 or a computer program loaded from a storage unit 808 into a random access memory (RAM) 803. Various programs and data required for the operation of the device 800 may be stored in the RAM 803. The computing unit 801, the ROM 802 and the RAM 803 are connected to each other through a bus 804. An input/output (I/O) interface 805 is further connected to the bus 804.

Various components in the device 800, including an input unit 806 such as a keyboard, a mouse, etc., an output unit 807 such as various types of displays, speakers, etc., a storage unit 808 such as a magnetic disk, an optical disk, etc., and a communication unit 809 such as a network card, a modem, a wireless communication transceiver, etc., are connected to the I/O interface 805. The communication unit 809 allows the device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 801 may perform the various methods and processes described above, such as the method for processing a map. For example, in some embodiments, the method for processing a map may be implemented as a computer software program that is tangibly contained on a machine-readable medium, such as a storage unit 808. In some embodiments, part or all of a computer program may be loaded and/or installed on the device 800 via the ROM 802 and/or the communication unit 809. When the computer program is loaded into the RAM 803 and executed by the computing unit 801, one or more steps of the method for processing a map described above may be performed. Alternatively, in other embodiments, the computing unit 801 may be configured to perform the method for processing a map in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may send the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trajectory ball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A computer-implemented method for processing a map, comprising:

segmenting a first road line to obtain a plurality of first sub-road lines, wherein the first road line is obtained by inputting an image corresponding to a target region into a semantic segmentation model to obtain a segmentation mask for the image;

performing a morphological processing on the segmentation mask for the image corresponding to the target region, so as to obtain a first initial road line; and compressing the first initial road line to obtain the first road line using Douglas-Peucker algorithm;

segmenting a second road line to obtain a plurality of second sub-road lines, wherein the second road line is obtained according to a trajectory information corresponding to the target region, and the trajectory information is denoised and filtered;

determining a target road line according to first similarities between the plurality of first sub-road lines and the plurality of second sub-road lines, wherein the first similarities are based on geometric features of first and second sub-road lines; and updating a current map according to the target road line, so as to obtain an updated map, wherein the method further comprises:

segmenting a current road line to obtain a plurality of current sub-road lines;

calculating second similarities between the plurality of current sub-road lines and the plurality of first sub-road lines; and deleting a first sub-road line whose second similarity with the plurality of current sub-road lines is greater than a preset second similarity threshold, so as to obtain at least one remaining first sub-road line, wherein the determining the target road line according to first similarities between the plurality of first sub-road lines and the plurality of second sub-road lines comprises:

determining the target road line according to first similarities between the at least one remaining first sub-road line and the plurality of second sub-road lines, wherein the method further comprises:

calculating third similarities between the plurality of current sub-road lines and the plurality of second sub-road lines; and deleting a second sub-road line whose third similarity with the plurality of current sub-road lines is greater than a preset third similarity threshold, so as to obtain at least one remaining second sub-road line, wherein the determining the target road line according to first similarities between the at least one remaining first sub-road line and the plurality of second sub-road lines comprises:

determining the target road line according to a first similarity between the at least one remaining first sub-road line and the at least one remaining second sub-road line.

2. The method according to claim 1, wherein the determining the target road line according to first similarities between the plurality of first sub-road lines and the plurality of second sub-road lines comprises:

calculating a first similarity between each of the plurality of first sub-road lines and each of the plurality of second sub-road lines;

according to a second sub-road line having the greatest first similarity with each first sub-road line, determining the second sub-road line corresponding to the first sub-road line;

obtaining K first sub-road line and K second sub-road line corresponding to the K first sub-road line, according to the first similarities and a preset first similarity threshold, wherein K is an integer greater than or equal to 1; and determining the target road line according to the K first sub-road line and the K second sub-road line.

3. The method according to claim 2, wherein the determining the target road line according to the K first sub-road line and the K second sub-road line comprises:

determining a $m^{th}$ target sub-road line according to a length of a $k^{th}$ first sub-road line and a length of a second sub-road line corresponding to the $k^{th}$ first sub-road line, wherein k is an integer less than or equal to K, and m is an integer greater than or equal to 1; and determining the target road line according to the $m^{th}$ target sub-road line.

4. The method according to claim 1, wherein the first road line and the second road line each comprise at least one vector point, the method further comprising:

for the at least one vector point of each of the first road line and the second road line, obtaining an $i^{th}$ first vector according to an $i^{th}$ vector point and an $(i-1)^{th}$ vector point, wherein i is an integer greater than or equal to 2;

obtaining an $i^{th}$ second vector according to the $i^{th}$ vector point and an $(i+1)^{th}$ vector point;

determining an $i^{th}$ angle according to the $i^{th}$ first vector and the $i^{th}$ second vector; and determining a segmentation point according to the $i^{th}$ vector point, in response to the $i^{th}$ angle being greater than a preset angle threshold, so as to obtain a plurality of segmentation points.

5. The method according to claim 4, wherein the segmenting a first road line to obtain a plurality of first sub-road lines comprises:

segmenting the first road line according to the plurality of segmentation points for the first road line, so as to obtain the plurality of first sub-road lines.

6. The method according to claim 4, wherein the segmenting a second road line to obtain a plurality of second sub-road lines comprises:

segmenting the second road line according to the plurality of segmentation points for the second road line, so as to obtain the plurality of second sub-road lines.

7. An electronic device, comprising:

at least one processor; and a memory communicatively connected to the at least one processor, wherein the memory stores instructions executable by the at least one processor, and the instructions, when executed by the at least one processor, are configured to cause the at least one processor to at least:

segment a first road line to obtain a plurality of first sub-road lines, wherein the first road line is obtained by inputting an image corresponding to a target region into a semantic segmentation model to obtain a segmentation mask for the image;

performing a morphological processing on the segmentation mask for the image corresponding to the target region, so as to obtain a first initial road line; and compressing the first initial road line to obtain the first road line using Douglas-Peucker algorithm;

segment a second road line to obtain a plurality of second sub-road lines, wherein the second road line is obtained according to a trajectory information corresponding to the target region, and the trajectory information is denoised and filtered;

determine a target road line according to first similarities between the plurality of first sub-road lines and the plurality of second sub-road lines;

update a current map according to the target road line, so as to obtain an updated map, wherein the instructions are further configured to cause the at least one processor to at least:

segment a current road line to obtain a plurality of current sub-road lines;

calculate second similarities between the plurality of current sub-road lines and the plurality of first sub-road lines; and delete a first sub-road line whose second similarity with the plurality of current sub-road lines is greater than a preset second similarity threshold, so as to obtain at least one remaining first sub-road line, and wherein the instructions are further configured to cause the at least one processor to at least:

determine the target road line according to first similarities between the at least one remaining first sub-road line and the plurality of second sub-road lines, and wherein the instructions are further configured to cause the at least one processor to at least:

calculate third similarities between the plurality of current sub-road lines and the plurality of second sub-road lines; and delete a second sub-road line whose third similarity with the plurality of current sub-road lines is greater than a preset third similarity threshold, so as to obtain at least one remaining second sub-road line, and wherein the instructions are further configured to cause the at least one processor to at least:

determine the target road line according to a first similarity between the at least one remaining first sub-road line and the at least one remaining second sub-road line.

8. The electronic device according to claim 7, wherein the instructions are further configured to cause the at least one processor to at least:

calculate a first similarity between each of the plurality of first sub-road lines and each of the plurality of second sub-road lines;

according to a second sub-road line having the greatest first similarity with each first sub-road line, determine the second sub-road line corresponding to the first sub-road line;

obtain K first sub-road line and K second sub-road line corresponding to the K first sub-road line, according to the first similarities and a preset first similarity threshold, wherein K is an integer greater than or equal to 1; and determine the target road line according to the K first sub-road line and the K second sub-road line.

9. The electronic device according to claim 8, wherein the instructions are further configured to cause the at least one processor to at least:

determine a $m^{th}$ target sub-road line according to a length of a $k^{th}$ first sub-road line and a length of a second sub-road line corresponding to the $k^{th}$ first sub-road line, wherein k is an integer less than or equal to K, and m is an integer greater than or equal to 1; and determine the target road line according to the $m^{th}$ target sub-road line.

10. The electronic device according to claim 7, wherein the first road line and the second road line each comprise at least one vector point, wherein the instructions are further configured to cause the at least one processor to at least:

for the at least one vector point of each of the first road line and the second road line, obtain an $i^{th}$ first vector according to an $i^{th}$ vector point and an $(i-1)^{th}$ vector point, wherein i is an integer greater than or equal to 2;

obtain an $i^{th}$ second vector according to the $i^{th}$ vector point and an $(i+1)^{th}$ vector point;

determine an $i^{th}$ angle according to the $i^{th}$ first vector and the $i^{th}$ second vector; and determine a segmentation point according to the $i^{th}$ vector point, in response to the $i^{th}$ angle being greater than a preset angle threshold, so as to obtain a plurality of segmentation points.

11. The electronic device according to claim 10, wherein the instructions are further configured to cause the at least one processor to at least:

segment the first road line according to the plurality of segmentation points for the first road line, so as to obtain the plurality of first sub-road lines.

12. The electronic device according to claim 10, wherein the instructions are further configured to cause the at least one processor to at least:

segment the second road line according to the plurality of segmentation points for the second road line, so as to obtain the plurality of second sub-road lines.

13. A non-transitory computer-readable storage medium having computer instructions therein, wherein the computer instructions are configured to cause a computer system to at least:

segment a first road line to obtain a plurality of first sub-road lines, wherein the first road line is obtained by inputting an image corresponding to a target region into a semantic segmentation model to obtain a segmentation mask for the image;

performing a morphological processing on the segmentation mask for the image corresponding to the target region, so as to obtain a first initial road line; and compressing the first initial road line to obtain the first road line using Douglas-Peucker algorithm;

segment a second road line to obtain a plurality of second sub-road lines, wherein the second road line is obtained according to a trajectory information corresponding to the target region, and the trajectory information is denoised and filtered;

determine a target road line according to first similarities between the plurality of first sub-road lines and the plurality of second sub-road lines, update a current map according to the target road line, so as to obtain an updated map, wherein the computer instructions are further configured to cause the computer system to at least:

segment a current road line to obtain a plurality of current sub-road lines;

calculate second similarities between the plurality of current sub-road lines and the plurality of first sub-road lines; and delete a first sub-road line whose second similarity with the plurality of current sub-road lines is greater than a preset second similarity threshold, so as to obtain at least one remaining first sub-road line, and wherein the computer instructions are further configured to cause the computer system to at least:

determine the target road line according to first similarities between the at least one remaining first sub-road line and the plurality of second sub-road lines, and wherein the computer instructions are further configured to cause the computer system to at least:

calculate third similarities between the plurality of current sub-road lines and the plurality of second sub-road lines; and delete a second sub-road line whose third similarity with the plurality of current sub-road lines is greater than a preset third similarity threshold, so as to obtain at least one remaining second sub-road line, and wherein the computer instructions are further configured to cause the computer system to at least:

determine the target road line according to a first similarity between the at least one remaining first sub-road line and the at least one remaining second sub-road line.

* * * * *